(12) United States Patent
Ramsteiner (10) Patent No.: US 11,971,058 B2
(45) Date of Patent: Apr. 30, 2024

(54) FASTENER ARRANGEMENT

(71) Applicant: Ehni Schaumstofftechnik GmbH, Bissingen (DE)

(72) Inventor: Willi Ramsteiner, Bergdietikon (CH)

(73) Assignee: Ehni Schaumstofftechnik GmbH, Bissingen (DE)

( * ) Notice: Subject to any disclaimer, the term of this patent is extended or adjusted under 35 U.S.C. 154(b) by 215 days.

(21) Appl. No.: 17/584,428

(22) Filed: Jan. 26, 2022

(65) Prior Publication Data

US 2023/0023576 A1 Jan. 26, 2023

(30) Foreign Application Priority Data

Jul. 26, 2021 (DE) .......................... 202021103982.5
Dec. 7, 2021 (EP) ..................................... 21212782

(51) Int. Cl.
*F16M 11/00* (2006.01)
*F16B 11/00* (2006.01)
*F16M 13/02* (2006.01)

(52) U.S. Cl.
CPC ........... *F16B 11/006* (2013.01); *F16M 13/02* (2013.01)

(58) Field of Classification Search
CPC ...... F16B 11/006; F16B 47/003; F16B 9/058; F16B 9/01; F16M 13/02
See application file for complete search history.

(56) References Cited

U.S. PATENT DOCUMENTS

| 4,693,652 A * | 9/1987 | Sweeney | F16B 13/143 411/258 |
| 5,277,530 A * | 1/1994 | Sweeney, Sr. | B29C 65/4825 411/930 |
| 6,017,176 A * | 1/2000 | Marui | F16B 37/048 411/258 |
| 7,833,620 B2 * | 11/2010 | Enserink | F16B 47/003 428/321.1 |
| 9,912,284 B2 * | 3/2018 | Svec | H02S 20/25 |
| 2014/0241790 A1 * | 8/2014 | Woleader | B29C 66/342 156/305 |
| 2017/0284439 A1 * | 10/2017 | Hardegen | F16B 11/006 |
| 2022/0403867 A1 * | 12/2022 | Rottler | F16B 41/002 |

FOREIGN PATENT DOCUMENTS

| DE | 202018106227 U1 | 10/2014 |
| WO | 2014166773 A1 | 3/2020 |

* cited by examiner

Primary Examiner — Amy J. Sterling
(74) *Attorney, Agent, or Firm* — Michael Soderman (57) ABSTRACT

A fastener arrangement with a fastener designed for fastening to a substrate by means of an adhesive agent, and with an object having an object mount, whereby the object mount can be fixed to the fastener fastened to the substrate. The fastener has a reinforcement part composed of a metallic material, the side wall elements of which are mounted between a retaining ring and edge segments of a holder. The side wall elements of the reinforcement part are designed for fixing the object mount. The fastener has a press-on element bounding an adhesive reservoir, wherein adhesive agent can be guided out of the adhesive reservoir through openings in the reinforcement part and in the holder by a displacement of the press-on element in the axial direction, such that the adhesive agent fixes the fastener to the substrate.

18 Claims, 12 Drawing Sheets

FASTENER ARRANGEMENT

CROSS REFERENCE TO RELATED APPLICATIONS

This application claims the priority of DE 202021103982.5 filed on 2021 Jul. 26 and the priority of EP 21212782.3 filed on 2021 Dec. 7; all applications are incorporated by reference herein in their entirety.

BACKGROUND

The invention relates to a fastener arrangement.

Such a fastener arrangement having a fastener is known from WO 2014/166773 A1.

This fastener arrangement serves to form an adhesive connection between an object and a support. The object has a reservoir with an adhesive agent that, with a wall having a predetermined breaking point, abuts a contact surface. The object has a button with a push-through means assigned to it, said means having the shape of a thorn or point, wherein when the button is actuated, the push-through means creates a hole in the wall of the reservoir, through which hole adhesive agent is guided from the reservoir onto the contact surface and forms an adhesive layer for fastening the object to the support.

In this device, the adhesive agent required for fastening to the support is stored in the object itself. The adhesive agent is released in a simple way through button-pushing, i.e. by actuating a button provided on or in the object itself. When this button is pushed, the adhesive agent flows from the reservoir onto the contact surface and there forms an adhesive layer, by means of which the object can be fastened to the support.

It is advantageous that the adhesive connection can be produced rapidly.

It is disadvantageous that the integration of the push-through means in the shape of a thorn or point requires undesirably high design effort, especially since the push-through means must be positioned exactly to the wall to ensure that a reproducible hole is made in this wall. This requires exact, low-tolerance mounting and as a result, requires high production costs for manufacturing the device.

DE 20 2018 106 227 U1 relates to a fastener with a support, which has a fastening side for fastening to an object. The support has a through borehole in the axial direction. An adhesive reservoir and a reservoir unit for a hydrophilic substance are mounted in the axial direction of the borehole so to be displaceable against one another. The adhesive reservoir and the receptacle body form a coaxial arrangement wherein the adhesive reservoir encloses the reservoir unit. In a starting position of the reservoir unit relative to the support, an aerobic adhesive agent is stored in a closed receptacle of the adhesive reservoir. The hydrophilic substance is stored in a closed receptacle in the reservoir unit. By displacing the reservoir unit into an actuation position, the receptacles are broken open by means of push-through means and the aerobic adhesive agent is supplied through a channel structure between the adhesive reservoir and the reservoir unit, and the hydrophilic substance is conducted through outlet openings in the reservoir unit to the fastening side, such that an autonomous mixing of the aerobic adhesive agent and the hydrophilic substance takes place.

With regard to this fastener, it is disadvantageous that the adhesive reservoir, on the one hand, and the reservoir unit for the hydrophilic substance, on the other hand, necessitate a relatively high design effort, especially since they must be displaceable against one another. Moreover, a not insubstantial design effort is required for thoroughly mixing the adhesive agent with the hydrophilic substance.

SUMMARY

The invention relates to a fastener arrangement (1) with a fastener (2) designed for fastening to a substrate by means of an adhesive agent, and with an object (4) having an object mount (3), whereby the object mount (3) can be fixed to the fastener (2) fastened to the substrate. The fastener (2) has a reinforcement part (11) composed of a metallic material, the side wall elements (19) of which are mounted between a retaining ring (10) and edge segments (9b) of a holder (9). The side wall elements (19) of the reinforcement part (11) are designed for fixing the object mount (3). The fastener (2) has a press-on element (8) bounding an adhesive reservoir (20), wherein adhesive agent can be guided out of the adhesive reservoir (20) through openings in the reinforcement part (11) and in the holder (9) by a displacement of the press-on element (8) in the axial direction, such that the adhesive agent fixes the fastener (2) to the substrate.

DETAILED DESCRIPTION

The invention seeks to solve the problem of providing a fastener arrangement of the type mentioned at the outset that has a simple design and simultaneously, high functionality and functional reliability.

The features of claim 1 are provided to solve this problem. Advantageous embodiments and useful further developments of the invention are described in the dependent claims.

The invention relates to a fastener arrangement with a fastener designed for fastening to a substrate by means of an adhesive agent, and with an object having an object mount, wherein the object mount can be fixed to the fastener fastened on the substrate. The fastener has a reinforcement part composed of a metallic material, the side wall elements of which are mounted between a retaining ring and edge segments of a holder. The side wall elements of the reinforcement part are designed for fixing the object mount. The fastener has a press-on element bounding the adhesive reservoir, wherein due to a displacement of the press-on element in the axial direction, adhesive agent can be guided out from the adhesive reservoir through openings in the reinforcement part and in the holder, such that the adhesive agent fixes the fastener to the substrate.

The fastener arrangement according to the invention generally serves for fastening an object to a substrate by means of a fastener, wherein the substrate especially can be formed by a wall of a building.

The objects to be fastened can be accessories for bathrooms, for example.

An essential requirement of such fastener arrangements is that objects can be fastened to the substrate with the fastener stably for a long time, wherein an essential requirement of the fastener is that it can withstand large forces, and not only pressure forces, but also shear forces, without the fastener detaching from the substrate.

This requirement is satisfied by the fastener arrangement according to the invention. An essential aspect of the invention is that the fastener has a reinforcement part composed of a metallic material, especially of steel.

On the one hand, this reinforcement part serves to stabilize the fastener itself, and on the other hand, ensures a stable coupling to the object mount.

The additional components of the fastener, especially the holder, the retaining ring and the press-on element, can be composed of plastic.

In the fastener according to the invention, the reinforcement part is mounted between a holder and a retaining ring.

The holder has a disk-shaped base body with openings, the outer side of which forms a placement area for placing onto the substrate.

For fastening to the substrate, the fastener is actuated such that adhesive agent is guided out through openings in the reinforcement part and into openings in the holder and forms an adhesive layer with which the fastener is fixed to the substrate.

Crosspieces delimiting openings of the holder and crosspieces delimiting openings of the reinforcement part lie within the adhesive layer and form a reinforcement for it.

This ensures further stabilization of the fastener to the substrate.

Advantageously, the fastener can be pre-fixed to the substrate before it is permanently fixed by means of the adhesive layer. An adhesive strip is advantageously provided for this purpose on the edge of the outer side of the holder.

According to an advantageous embodiment, the reinforcement part has a flat body with openings resting on the rear side of the holder, wherein side wall elements open out at opposite edges of the flat body, the edge regions of said elements forming contact surfaces for placement against the object mount.

Adapted thereto, the holder has two edge segments opposite one another projecting from the base body, wherein the side wall elements of the reinforcement part are mounted in gaps between the edge segments.

It is essential in this regard that the edge regions of the side wall elements forming the contact surfaces project outward over the edge segments of the holder.

By this adaptation of the holder to the reinforcement part, a double function of the reinforcement part is achieved in a simple design manner, such that the reinforcement part effects a stabilization of the fastener itself and additionally ensures a stable coupling to the object mount.

The coupling of the reinforcement part to the object mount is completed in that the outer sides of the side wall elements of the reinforcement part form sloping surfaces, whereby for fastening the object mount to the fastener, a setscrew mounted in the object mount is guided against one of the sloping surfaces.

The fastening by means of the setscrew guided against the sloping surface represents a simple design solution, especially compared to screw connections, yet nevertheless represents a reliable, even considering tolerances of the individual components, reliable fastening option.

Advantageously, the object mount has the shape of a hollow cylinder, which is open at one face, wherein the fastener can be inserted into the object mount through the open face.

The contact surfaces of the reinforcement part then abut the inner side of the side wall of the hollow-cylindrical object mount.

The object mount therefore has a shape that is adapted to the outer contour of the fastener. The object is fastened at the closed face of the hollow-cylindrical object mount, especially by means of a screw connection.

With regard to the fastener according to the invention, it is advantageous that the retaining ring be mounted at the edge segments of the mount in such a manner as to be secured against rotation.

It is useful for protrusions, which engage in cavities of the retaining ring, to open out on the inner sides of the edge segments.

With this mounting secured against rotation, the reinforcement part is securely incorporated between the retaining ring and the mount.

The retaining ring fulfils a further function such that it forms a guide for the press-on element, which serves for actuating the fastener.

In this regard, it is advantageous for the press-on element, in a locked position, to be positionally-fixed at the retaining ring and adjoin the adhesive reservoir. The fastener is not actuated in this locked position.

It is useful for this positional fixing to be realized in that recesses are provided on the inner wall of the retaining ring, wherein in the locked position of the press-on element, projecting latching lips on its outer lateral surface engage in the recesses of the retaining ring.

According to a first variant of the invention, when the press-on element is in the locked position, the adhesive agent is stored in the adhesive reservoir, such that the fastener with the adhesive agent stored in the adhesive reservoir forms a sales unit. To prevent the adhesive agent from curing in the adhesive reservoir, the fastener is stored in a vacuum-sealed package and thereby forms a transportable unit.

According to a second variant of the invention, a sales unit is formed in that the adhesive agent is transported separately stored in a tube, wherein the fastener then as a further transportable unit does not contain adhesive agent in the adhesive reservoir. The adhesive agent is not guided out of the tube into the adhesive reservoir of the fastener until the fastener is fastened to a substrate.

A different type of container can also be provided instead of a tube.

The tube storing the adhesive agent has an outlet opening at its front end, in the known manner. To prevent the adhesive agent from prematurely curing, the outlet opening is sealed with a membrane, such that the tube forms a gas-tight encapsulation for the adhesive agent.

Advantageously, the press-on element has a filling opening through which adhesive agent can be supplied into the adhesive reservoir when the press-on element is in the locked position, i.e. adhesive agent is guided out of the tube and supplied through the filling opening into the adhesive reservoir of the fastener.

It is useful for the filling opening to have a thread onto which a threaded head of the tube can be screwed, wherein adhesive agent can be supplied into the adhesive reservoir when the tube is screwed onto the filling opening.

The tube is then in a target position at the press-on element of the fastener, such that adhesive agent can be supplied completely and directly from the tube to the adhesive reservoir through the filling opening.

Before the tube is screwed onto the filling opening, the membrane of the tube is pierced open on a piercing point on the press-on element, such that adhesive agent can exit the tube.

Advantageously, an adhesive strip is provided on the edge of the outer side of the holder, wherein a pre-fixing of the fastener on the substrate can be carried out by means of the adhesive strip.

Such a pre-fixing is also carried out in the variant of the fastener arrangement without a tube.

Then the actual fastening of the fastener to the substrate is carried out by means of the adhesive agent.

In the locked position, the press-on element is secured against axial movement, such that the fastener cannot be actuated.

To allow actuating the fastener, the press-on element is rotated from the locked position into an actuation position, wherein the rotation is carried out about an axis of rotation coincident with the axis of symmetry of the fastener.

This rotation can be performed by an operating person without the use of tools. The recesses in the retaining ring and the associated latching lips of the press-on element are dimensioned such that upon rotation of the press-on element, the latching lips release from the cavities by elastic deformation of the components composed of plastic.

In this regard, the circumstance that the press-on element projects over the edge of the retaining ring facing away from the holder is advantageously exploited.

The operating person can therefore grasp the press-on element at the segment projecting over the retaining ring and rotate it out of the locked position into the actuation position.

After the press-on element has been rotated into the actuation position, the operating person can actuate the fastener by pressing the press-on element in the direction of the base body of the holder until the press-on element locks flush with the retaining ring and forms a continuous flat surface upon which the base of the object mount can be placed. The adhesive agent then flows out of the adhesive reservoir and forms an adhesive layer adjoining the substrate, which after curing ensures a stable fastening of the fastener to the substrate.

Once the fastener is fastened to the substrate, the object mount with the object fastened on it can be mounted on the fastener.

BRIEF DESCRIPTION OF THE DRAWINGS

The invention is explained in the following based on the drawings. They show.

DETAILED DESCRIPTION OF THE PREFERRED EMBODIMENTS

Figure 1:
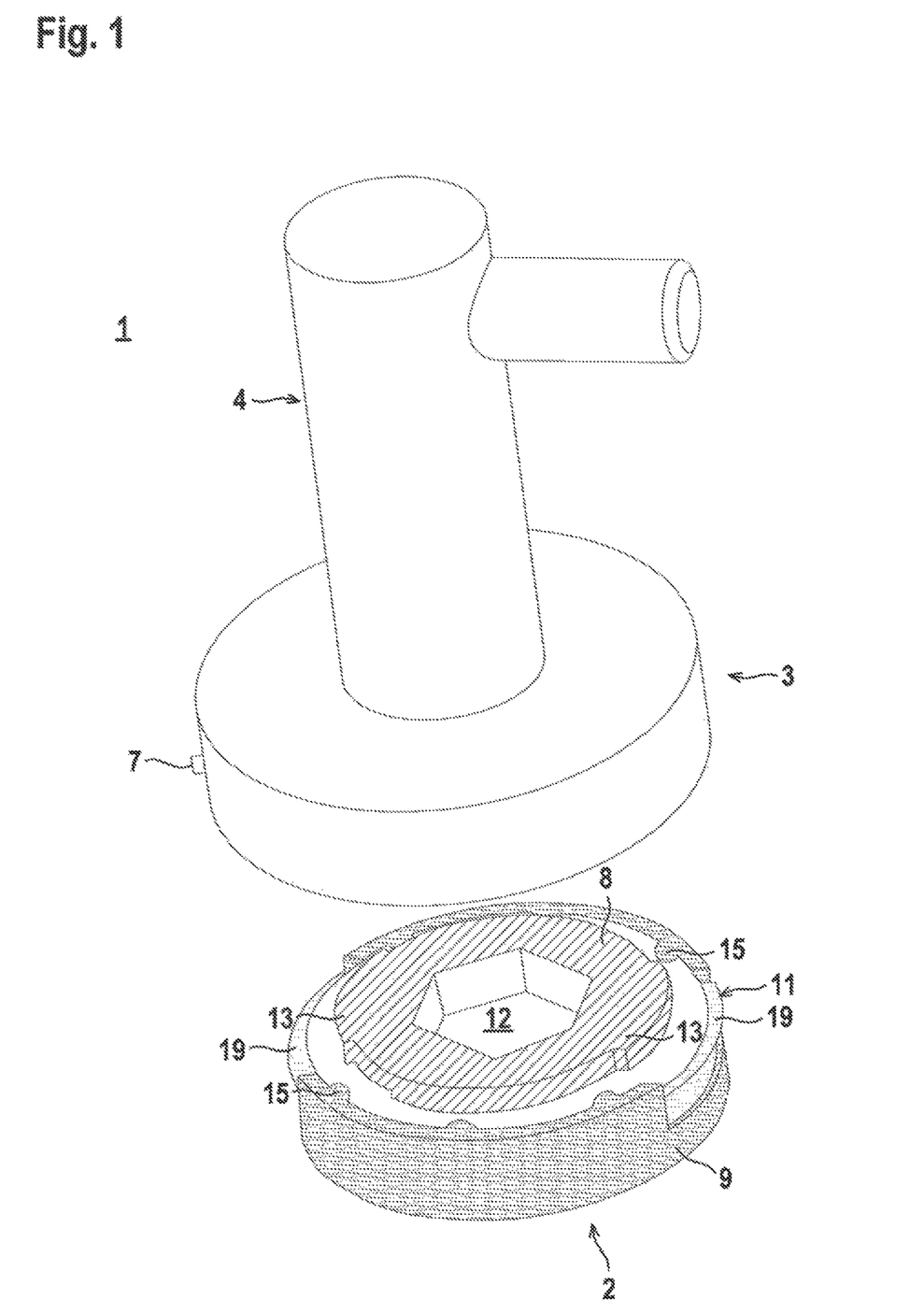
FIG. 1: Perspective view of a first embodiment of the fastener arrangement according to the invention.
Figure 2:
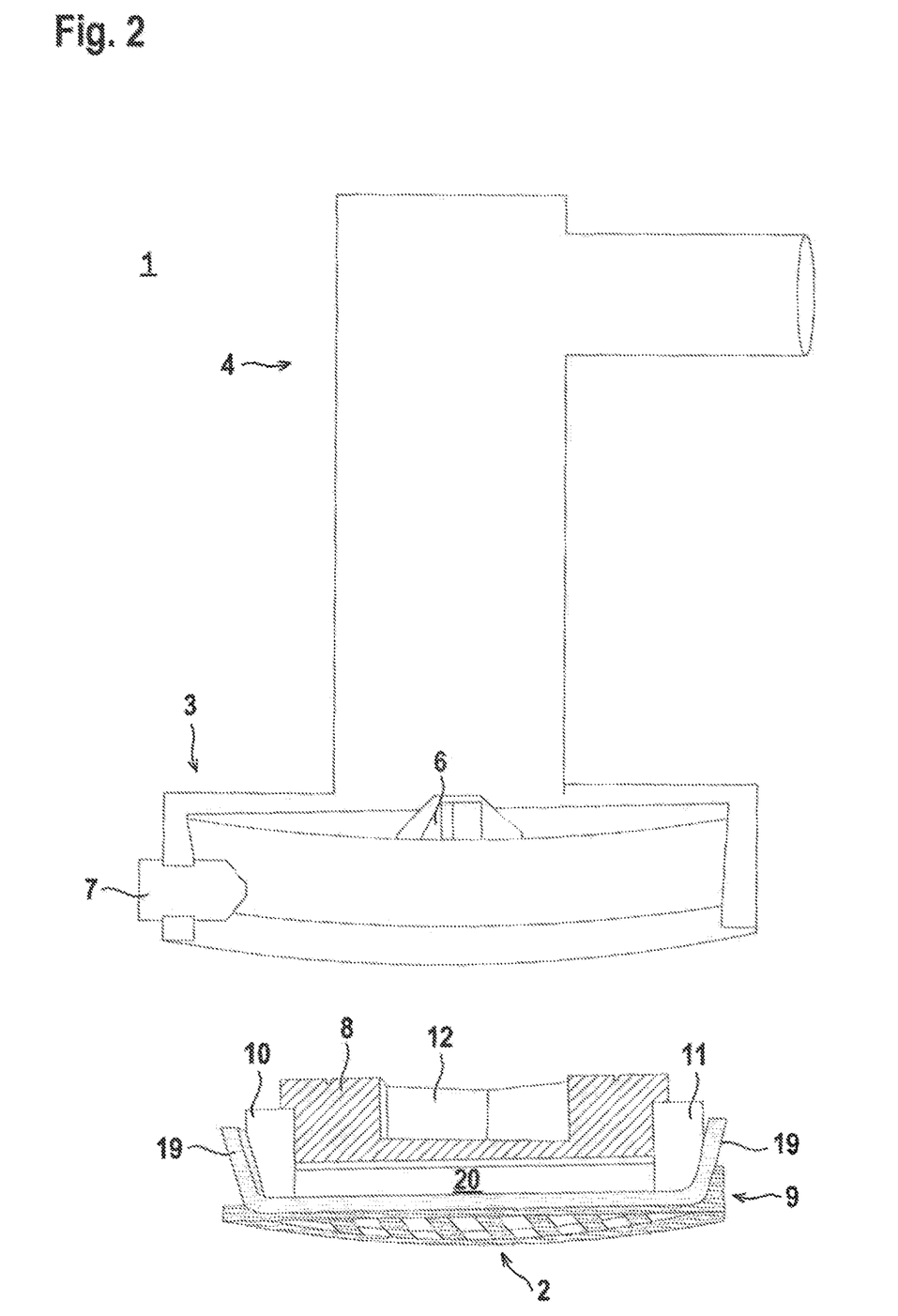
FIG. 2: Cross-sectional view of the fastener arrangement according to FIG. 1.
Figure 3:
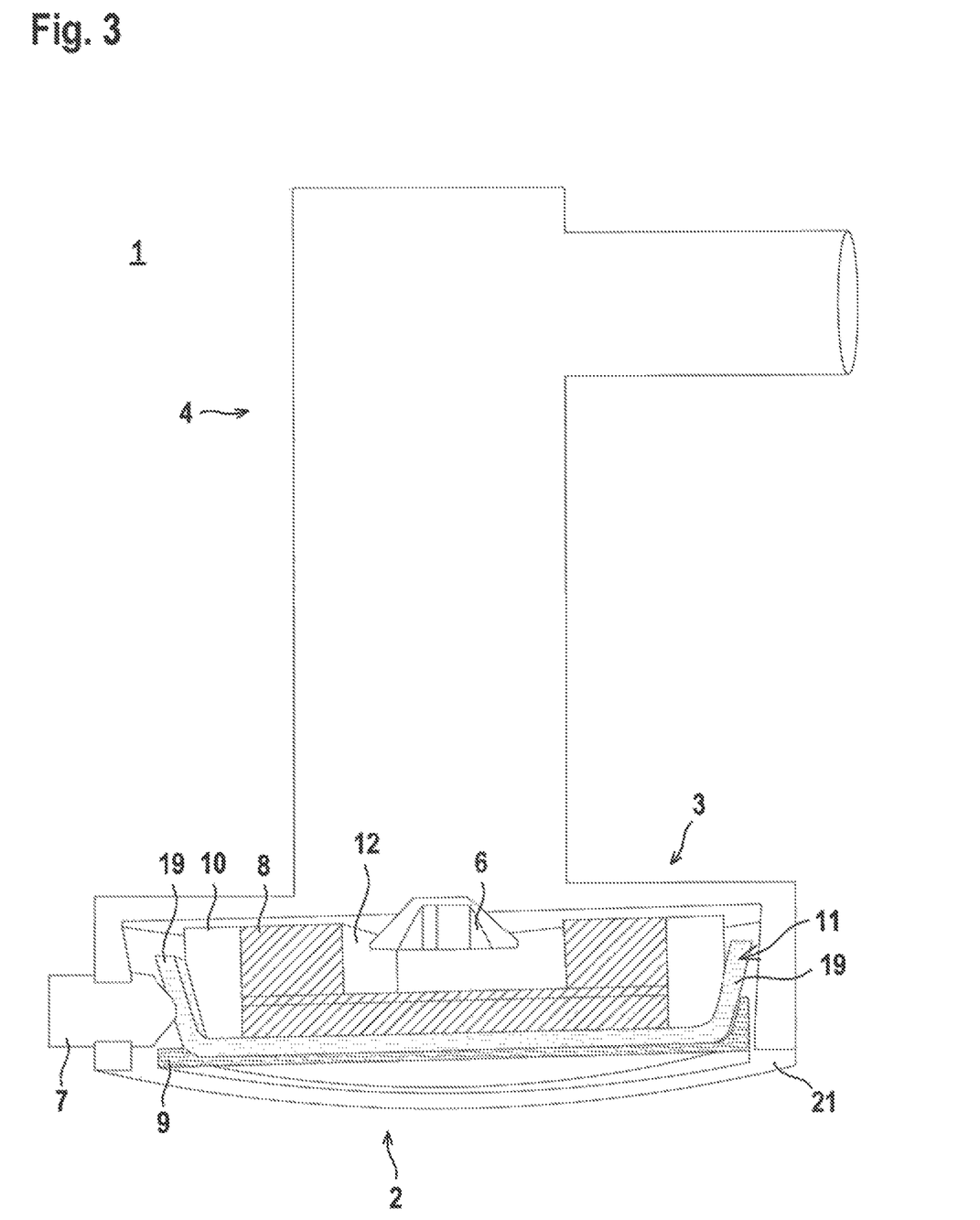
FIG. 3: Cross-sectional view of the fastener arrangement according to FIG. 1 in the assembled state.

FIGS. 1 to 3 show a first exemplary embodiment of the fastener arrangement 1 according to the invention. The fastener arrangement 1 is composed of a fastener 2 as well as an object mount 3, on which an object 4, in the present case, a hand towel rack, is mounted.

In FIGS. 1 to 3, the object mount 3 is shown above the fastener 2. This arrangement serves as the reference for the words "above" and "below" used in the following.

Figure 4:
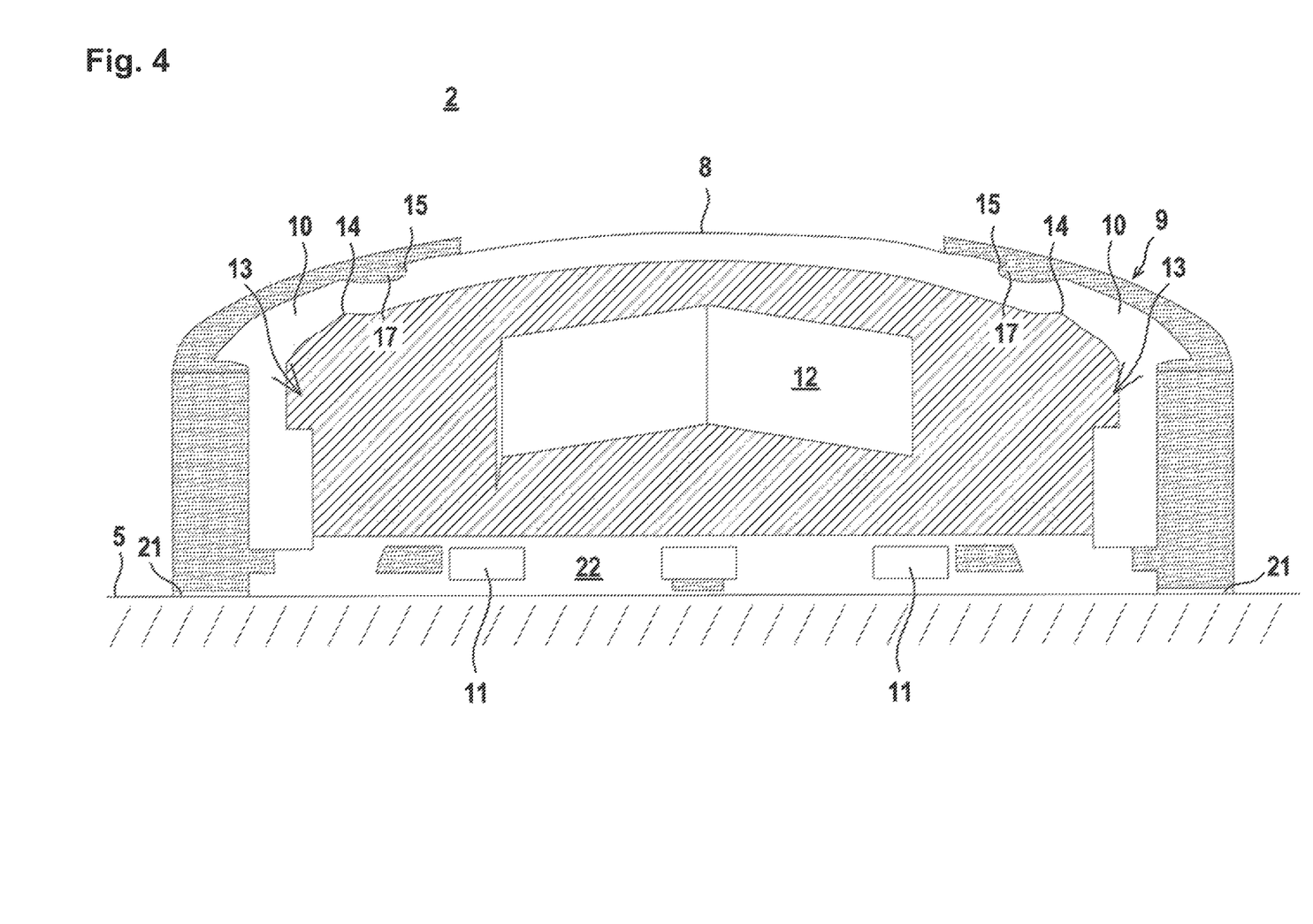
FIG. 4: Fastener of the fastening arrangement according to FIGS. 1 to 3 fastened to a wall.

The fastener 2 can generally be fixed to a substrate. FIG. 4 shows the fastener 2 fixed to a substrate formed by a wall 5, especially of a bathroom, wherein the wall 5, of course, contrary to the depiction in FIG. 4, runs in a vertical plane.

The object mount 3 is composed of a flat hollow-cylindrical body that is open on its bottom. The object 4, i.e. the hand towel rack, is fastened to the closed top side of the object mount 3 by means of a screw 6.

As FIG. 3 shows, the object mount 3 can be placed upon the fastener 2. A setscrew 7 is mounted on a side wall of the object mount 3 for fixing to the fastener 2.

The fastener 2 has an essentially cylindrical outer contour and is, like the object mount 3, designed with rotational symmetry to an axis of rotation running in the axial direction of the object holder 3 or of the fastener 2.

Figure 7:
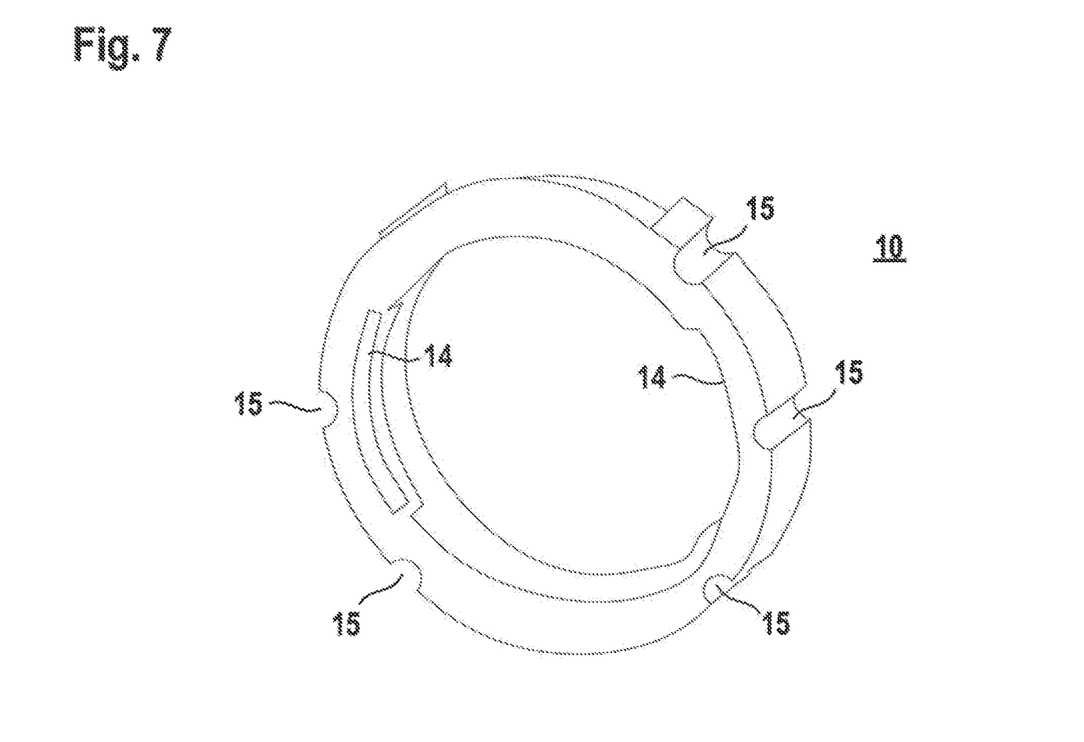
FIG. 7: Detail drawing of a retaining ring according to FIGS. 1 to 3.
Figure 8:
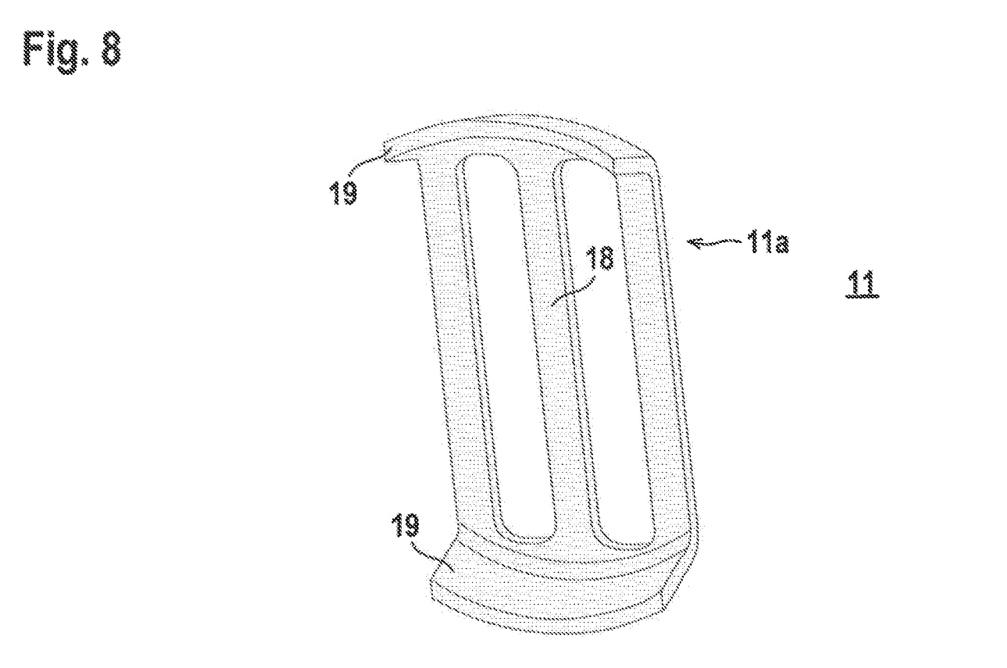
FIG. 8: Detail drawing of a reinforcement part according to FIGS. 1 to 3.
Figure 9:
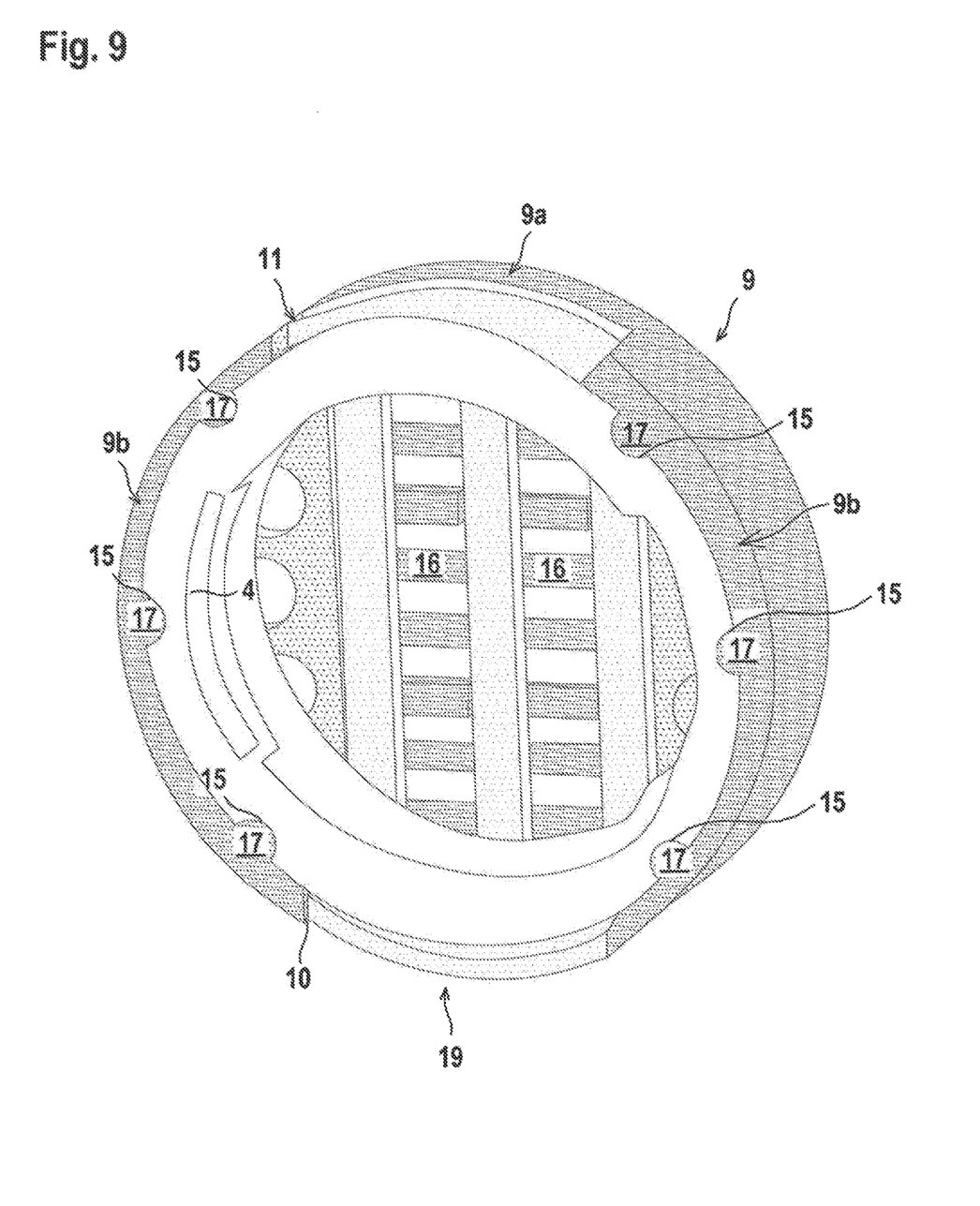
FIG. 9: Pre-assembled unit composed of the holder, the retaining ring and the reinforcement part according to FIGS. 6 to 8.

In terms of individual components, the fastener 2 has a press-on element 8 (shown individually in FIG. 5), a holder 9 (shown individually in FIG. 6), a retaining ring 10 (shown individually in FIG. 7) and a reinforcement part 11 (shown individually in FIG. 8). FIG. 9 shows the retaining ring 10, the reinforcement part 11 and the holder 9 as a preassembled unit.

The reinforcement part 11 is composed of steel. The press-on element 8, the retaining ring 10 and the holder 9 are composed of plastic.

Figure 5:
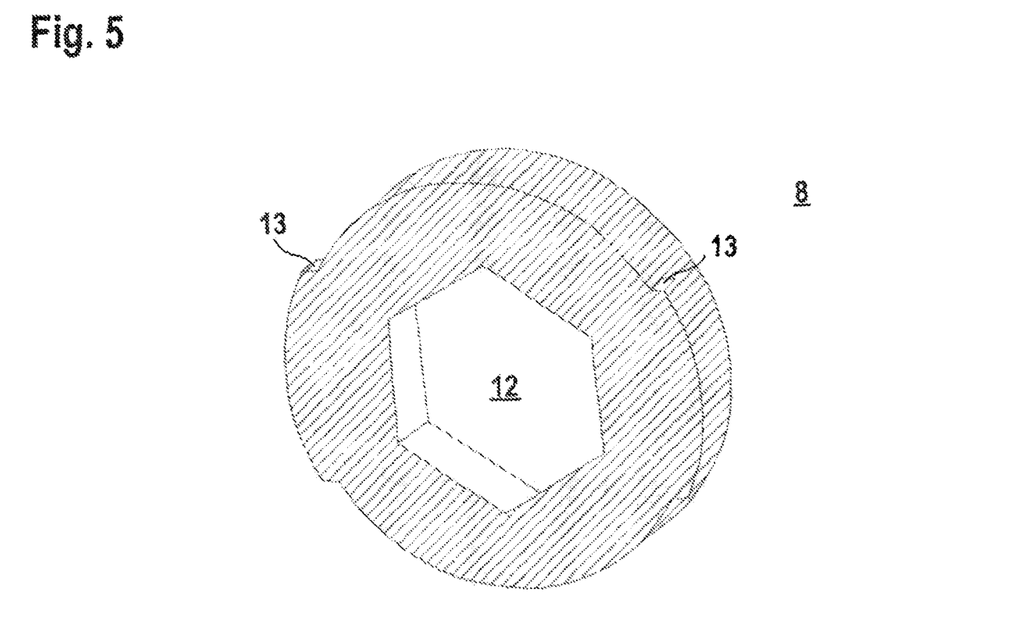
FIG. 5: Detail drawing of a press-on element according to FIGS. 1 to 3.

As shown in FIG. 5, the press-on element 8 is designed in the form of a flat circular-cylindrical solid body. There is an indentation 12 on the top of the press-on element 8 into which the screw 6 of the object mount 3 projects when the fastener arrangement 1 is assembled.

Latching lips 13 open out at opposite regions of the upper edge of the press-on element 8. The two latching lips 13 are identically formed and project outward from the lateral surface of the press-on element 8.

On the upper edge of its inner side, the circular retaining ring 10 has two recesses 14 arranged opposite one another and adapted to the shape and size of the latching lips 13, such that once a press-on element 8 is inserted in the retaining ring 10, the latching lips 13 can be held in the recesses 14 (FIG. 7).

The retaining ring 10 has cavities 15 on its outer lateral surface.

Figure 6:
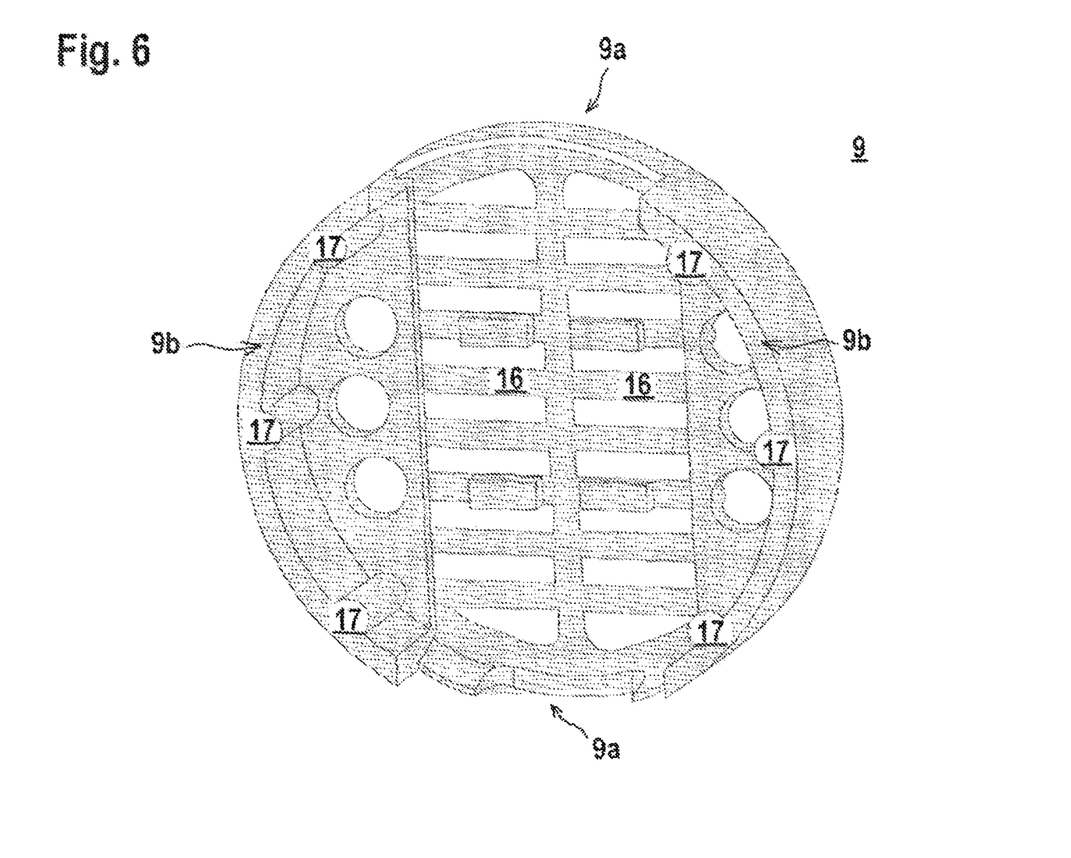
FIG. 6: Detail drawing of a holder according to FIGS. 1 to 3.

The holder 9 has a circular-disc shaped base body 9a having a structure of openings which are delimited by crosspieces 16 (FIG. 6).

Two identically formed edge segments 9b arranged opposite one another project from the base body 9a of the holder 9. Protrusions 17 project from the inner sides of the edge segments 9b, which protrusions 17 are adapted to the contours of the cavities 15 of the retaining ring 10.

The reinforcement part 11 made of steel has a flat body 11a with a structure of openings which are delimited by crosspieces 18 (FIG. 8). Side wall elements 19 open out on opposite edges of the flat body 11a, the outer sides of said elements forming sloping surfaces inclined toward the flat body 11a.

FIG. 8 shows a preassembled unit of the fastener 2 in which the retaining ring 10 is fixed to the holder 9 and the reinforcement part 11 is held between retaining ring 10 and holder 9.

The flat body 11a of the reinforcement part 11 then lies upon the base body 9a of the holder 9, wherein the crosspieces 16 of the holder 9 and the crosspieces 18 of the flat body 11a form a crossed arrangement, such that openings remain between them.

The side wall elements 19 of the reinforcement part 11 are mounted with minimal play in gaps between the edge segments 9b of the holder 9 such that their edge regions project outward beyond the holder 9. These projecting edge regions of the reinforcement part 11 form contact surfaces that abut the inner side of the object mount 3 when it is positioned on the fastener 2.

The retaining ring 10, with its recesses 14, is latched in with the protrusions 17 provided on the inner sides of the edge segments 9b of the holder 9, by which the retaining ring 10 is fixed on the holder 9 so to be secured against rotation and the reinforcement part 11 is positionally fixed.

Adhesive agent is filled into this preassembled unit and the press-on element 8 is fixed in a locked position at the retaining ring 10, such that an adhesive reservoir 20 results below the retaining ring 10 (FIG. 2). In the present case, the adhesive agent is in the form of an air-curing industrial adhesive.

In the locked position, the latching lips 13 of the press-on element 8 lie in the recesses 14 of the retaining ring 10, such that the press-on element 8 is positionally secured and especially cannot be pressed downward against the adhesive reservoir 20. In this locked position, the press-on element 8 projects upward above the retaining ring 10 (FIGS. 1 and 2). The fastener 2 is thus completely assembled.

In the locked position, the adhesive reservoir 20 is securely mounted. The fastener 2 thus can be stored in a vacuum-sealed package. The bottom of the holder 9 then is advantageously sealed with an adhesive foil or the like.

To fasten the fastener 2 to the substrate, the wall 5 in the present case, the fastener 2 is first pressed against the wall 5 and is pre-fixed there with an adhesive strip 21 provided on the outer edge of the bottom of the holder 9.

An operating person then rotates the press-on element 8 from the locked position into an actuation position. The operating person therefore grasps the part of the press-on element 8 projecting above the retaining ring 10 and rotates the retaining ring 10 about the axis of rotation, preferably by 90°. The latching lips 13 of the press-on element 8 then release from the recesses 14 of the retaining ring 10.

In the actuation position, the press-on element 8 then can be pressed downward against the holder 9 by the operating person until the top of the press-on element 8 closes flush with the top of the retaining ring 10 (FIGS. 3 and 4). The adhesive agent is thereby pressed downward out of the adhesive reservoir 20 and pressed through the openings of the reinforcement part 11 and the holder 9, and forms an adhesive layer 22 on the wall 5 (FIG. 4).

After the adhesive layer 22 cures, the fastener 2 is fixed to the wall 5. The crosspieces 16, 18 of the reinforcement part 11 and the holder 9 lying in the adhesive layer 22 form a reinforcement that stabilizes the adhesive layer 22.

The object mount 3 is placed on the fastener 2, now fixed to the wall 5, and is fixed by means of the setscrew 7, in that the setscrew 7 presses against the sloped surface of a side wall element 19 of the reinforcement part 11 (FIG. 3). Moreover, the contact surfaces of the side wall elements 19 abut the inner side of the object mount 3.

FIGS. 10A, 10B, 11A, 11B and 12 show a second exemplary embodiment of a fastener 2 of a fastener arrangement 1 as shown in FIG. 1.

Figure 10A:
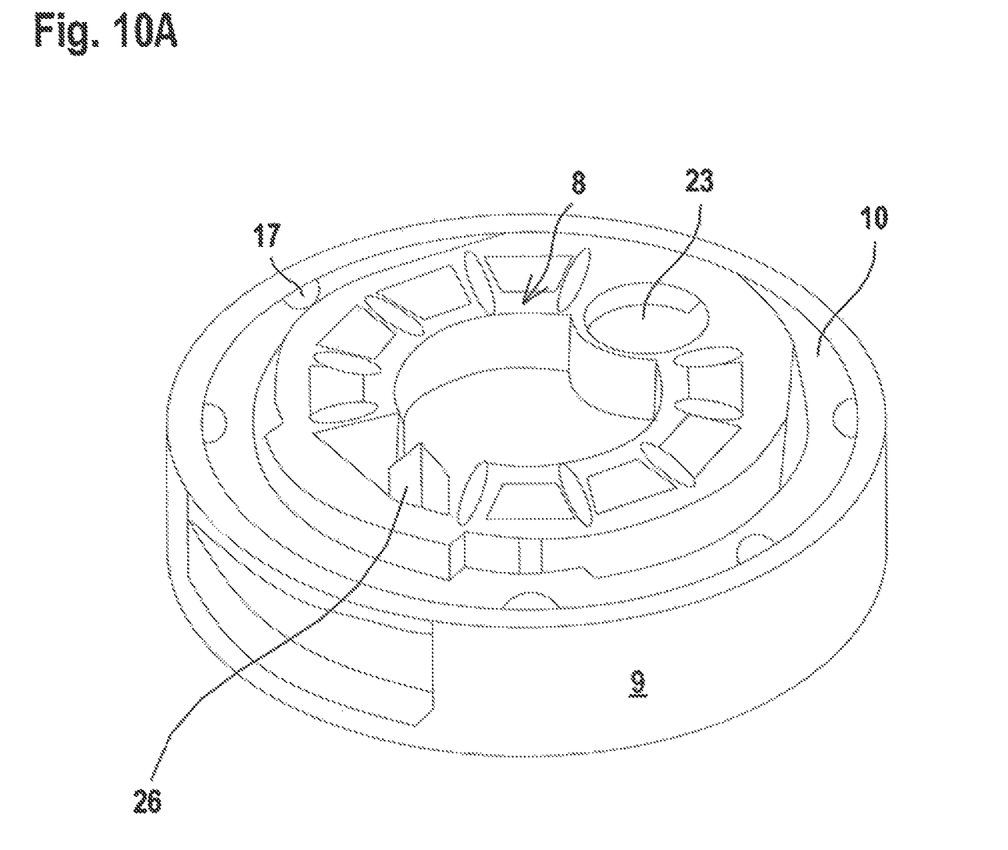
FIG. 10A: Second embodiment of the fastener arrangement according to the invention in a perspective view.
Figure 10B:
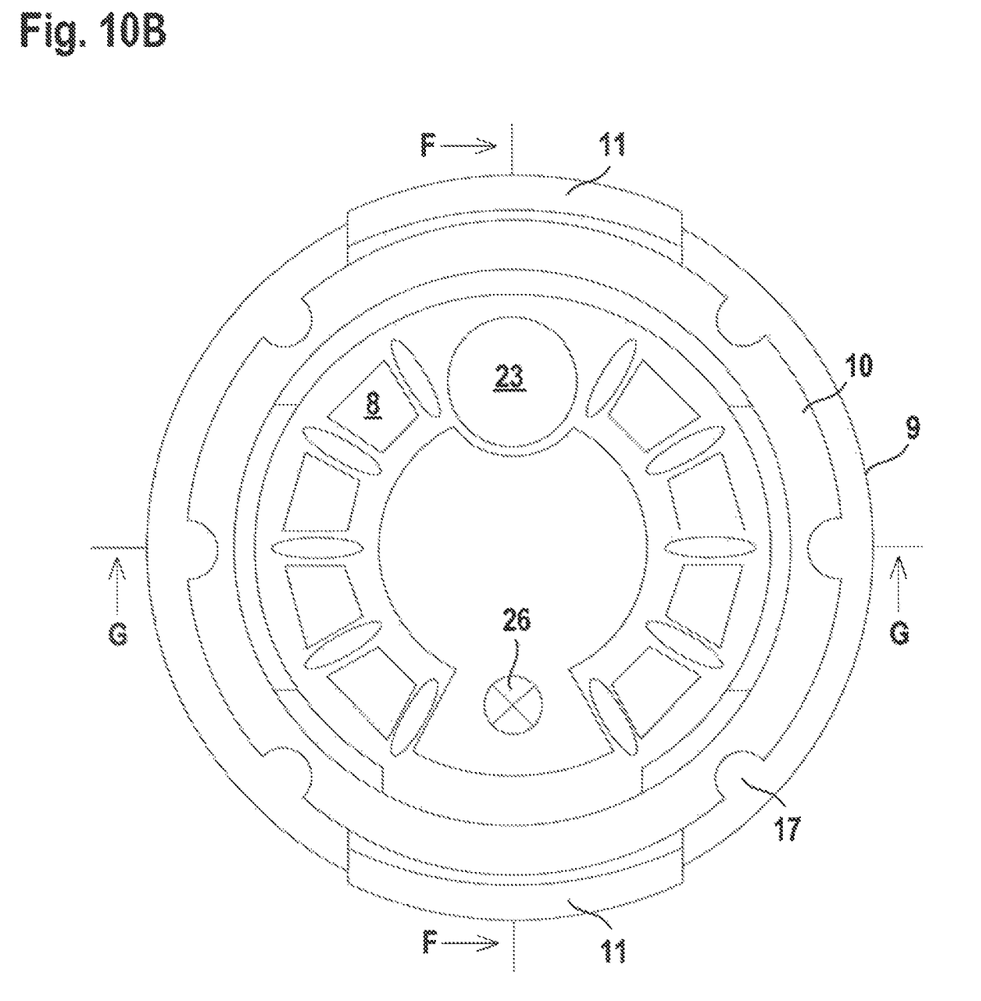
FIG. 10B: Second embodiment in a top view.
Figure 10C:
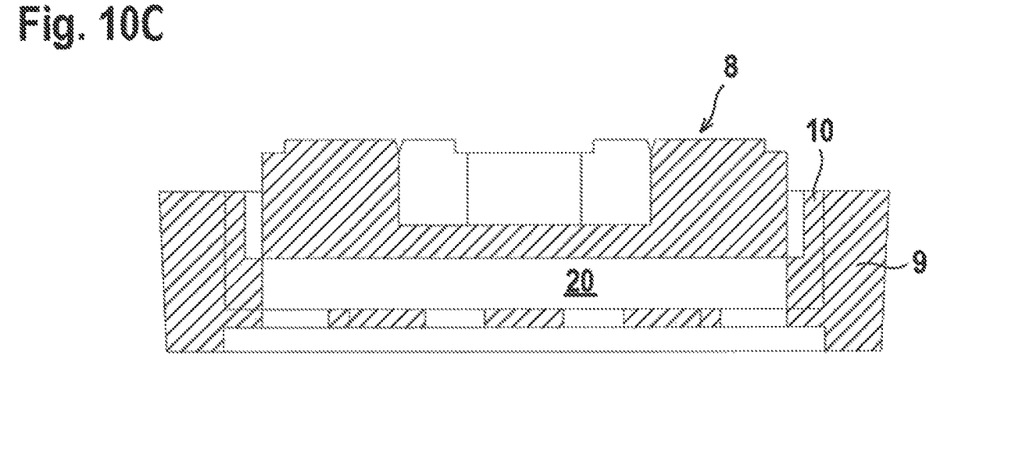
FIG. 10C: Second embodiment in a cross-sectional view in the plane G-G of FIG. 10B.
Figure 10D:
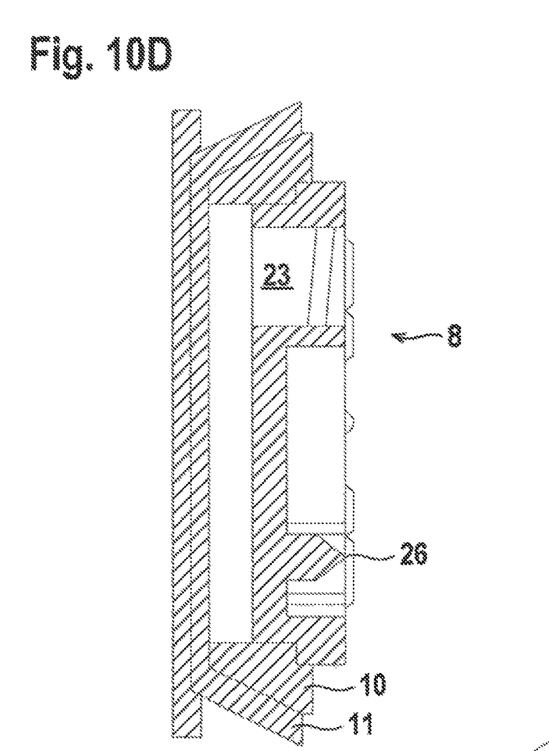
FIG. 10D: Second embodiment in a cross-sectional view in the plane F-F of FIG. 10B.

Corresponding to the first embodiment, the fastener 2 of the second exemplary embodiment also has a reinforcement part 11, a retaining ring 10, a press-on element 8 and a holder 9.

The difference compared to the first embodiment is that the press-on element 8 of the second exemplary embodiment has a filling opening 23 which opens out on the top of the press-on element 8, continues through said press-on element 8 in the axial direction and opens out in the adhesive reservoir 20 of the fastener 2.

Different than in the first embodiment, the adhesive agent is not pre-stored in the adhesive reservoir 20. Rather, the adhesive agent is stored separately in a tube 24, the outlet opening of which is sealed with a membrane such that the adhesive agent is stored gas-tight in the tube 24.

The fastener 2 (without adhesive agent) and the tube 24 with the adhesive agent therefore form separate, transportable sales units.

FIGS. 10A, 10B show the fastener 2 with the press-on element 8 in the locked position, in which the press-on element 8 projects over the upper edge of the holder 9.

The fastener 2, as shown in FIGS. 10A to 10D, can be pre-fixed to a substrate by means of the adhesive strip 21.

The adhesive reservoir 20 of the fastener 2 is then still empty, i.e., no adhesive agent is yet present there.

Figure 11A:
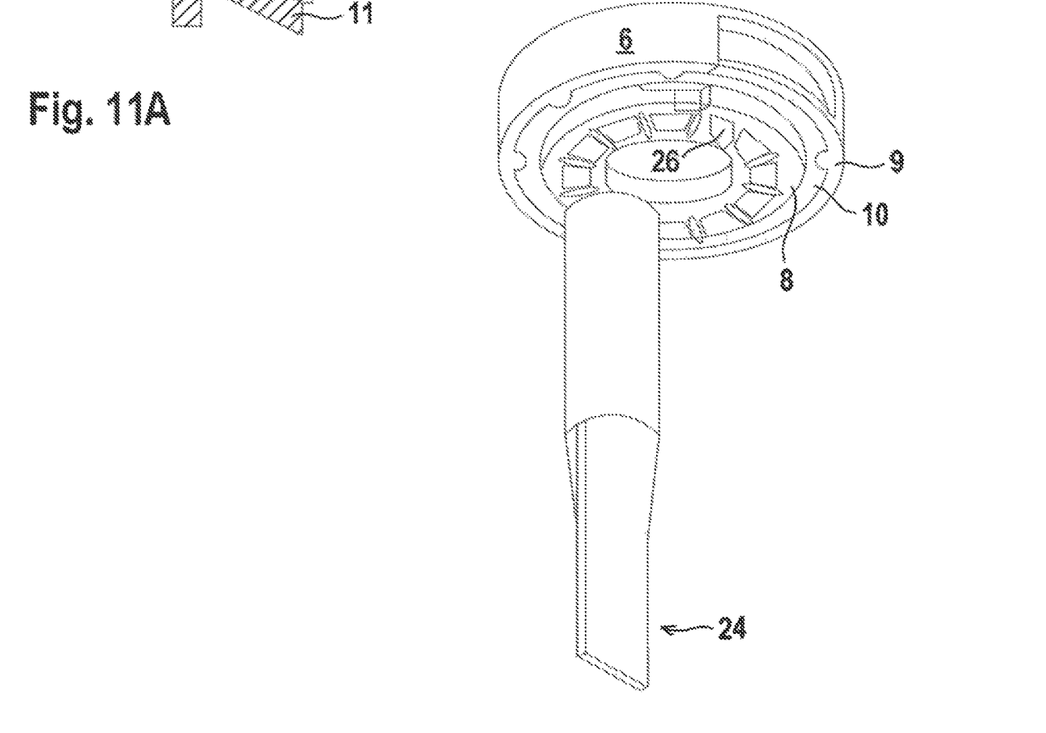
FIG. 11A: Fastener with a tube mounted upon it in a perspective view.
Figure 11B:
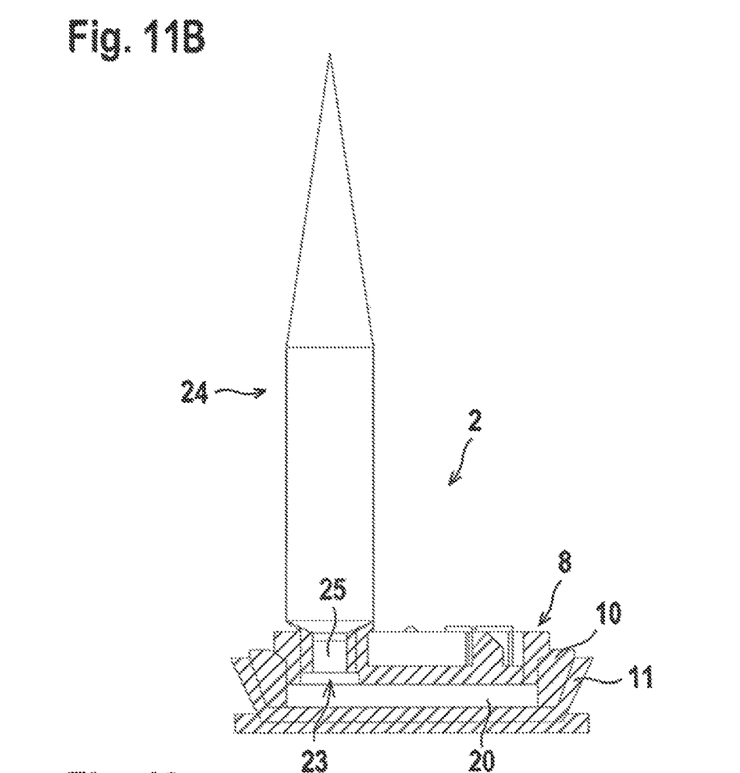
FIG. 11B: Fastener with a tube mounted upon it in a cross-sectional view.
Figure 12:
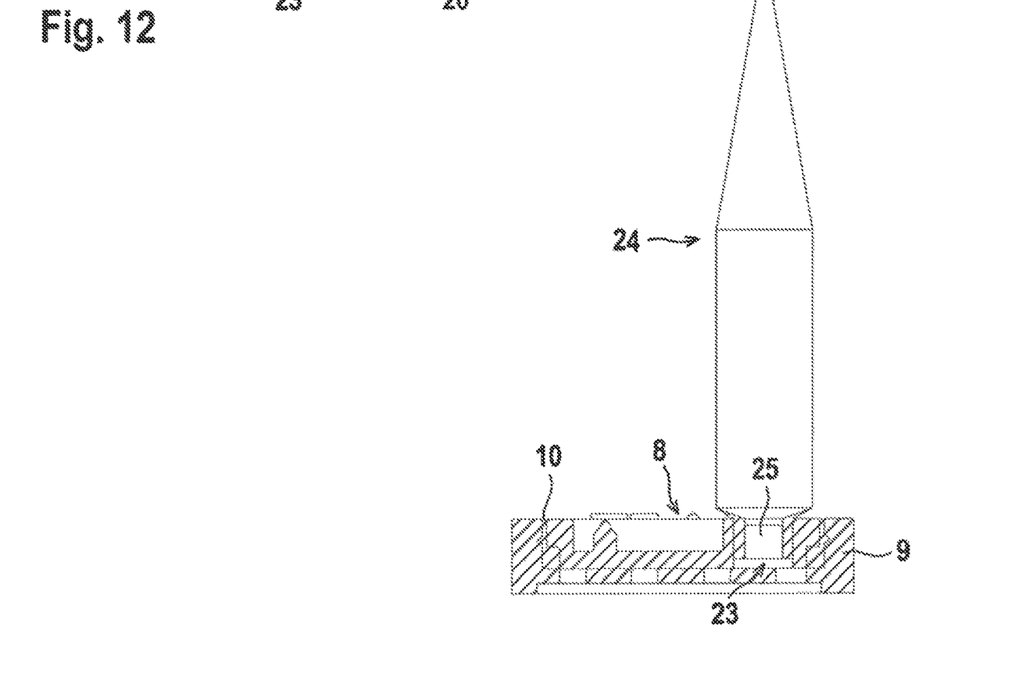
FIG. 12: Arrangement according to FIG. 11B with actuated actuator.

To fill the adhesive reservoir 20 with adhesive agent, the tube 24 is fastened to the filling opening 23 of the press-on element 8 (FIGS. 11A, 11B). As shown there, the tube 24 has a threaded head 25, the front end of which is sealed with the membrane.

First the membrane of the tube 24 is pierced open on a piercing point 26 of the press-on element 8 of the fastener 2. The threaded head 25 is then screwed into the filling opening 23, wherein the filling opening has a corresponding thread to the external thread of the threaded head 25.

Adhesive agent can then be filled into the adhesive reservoir from the tube 24 by pressing against the tube 24.

The press-on element 8 is then rotated to an actuation position and the press-on element 8 is then pressed downward against the substrate (FIG. 12), by which the adhesive agent comes into contact with the substrate and forms an adhesive layer 22, which after curing fixes the fastener 2 to the substrate. After the press-on element 8 is pressed, the tube 24 can be removed.

Figure 13:
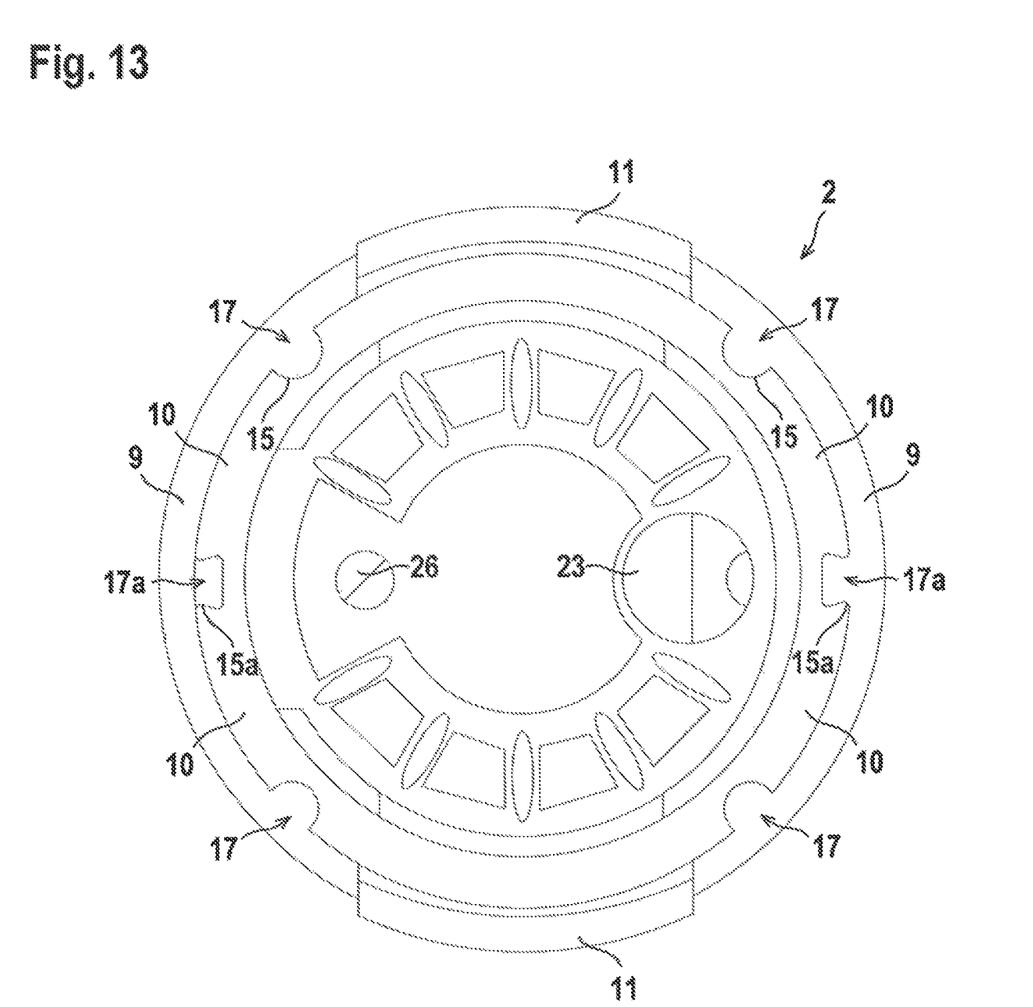
FIG. 13: Variant of the embodiment according to FIGS. 10A, 10B.

FIG. 13 shows a variant of the embodiment of FIGS. 10A, 10B. There, two protrusions 17 arranged opposite one another of the holder 9 are replaced by wedge-shaped protrusions 17a which engage in correspondingly formed wedge-shaped cavities 15a of the retaining ring 10, by which the hold between retaining ring 10 and holder 9 is improved.

Otherwise, the exemplary embodiment according to FIG. 13 corresponds to the embodiment of FIGS. 10A, 10B.

LIST OF REFERENCE NUMERALS (1) fastener arrangement
(2) fastener
(3) object mount (4) object
(5) wall
(6) screw
(7) setscrew
(8) press-on element
(9) holder
(9a) base body
(9b) edge segment
(10) retaining ring
(11) reinforcement part
(11a) flat body
(12) indentation
(13) latching lips
(14) recess
(15) cavity
(15a) wedge-shaped cavity
(16) crosspiece
(17) protrusion
(17a) wedge-shaped protrusion
(18) crosspiece
(19) side wall element
(20) adhesive reservoir
(21) adhesive strip
(22) adhesive layer
(23) filling opening
(24) tube
(25) threaded head
(26) piercing point

The invention claimed is:

1. A fastener arrangement (1) with a fastener (2) which is designed for fastening to a substrate by means of an adhesive, and with an object (4) having an object mount (3), wherein the object mount (3) can be fixed to the fastener (2) fastened to the substrate, characterized in that the fastener (2) has a reinforcement part (11) composed of a metallic material, the side wall elements (19) of which are mounted between a retaining ring (10) and edge segments (9b) of a holder (9), wherein the side wall elements (19) of the reinforcement part (11) are designed for fixing the object mount (3), and that the fastener (2) has a press-on element (8) bounding an adhesive reservoir (20), wherein adhesive agent can be guided out of the adhesive reservoir (20) through openings in the reinforcement part (11) and in the holder (9) by a displacement of the press-on element (8) in the axial direction, such that the adhesive agent fixes the fastener (2) to the substrate, wherein
the outer sides of the side wall elements (19) of the reinforcement part (11) form sloping surfaces, wherein a setscrew (7) mounted in the object mount (3) is guided against one of the sloping surfaces for fixing the object mount (3) to the fastener (2).

2. The fastener arrangement (1) according to claim 1, characterized in that the reinforcement part (11) is composed of steel, and/or that the retaining ring (10), the holder (9) and the press-on element (8) are composed of plastic.

3. The fastener arrangement (1) according to claim 1, characterized in that the holder (9) has a circular-disc shaped base body (9a) with openings, the outer side of which forms a placement surface for placement on the substrate.

4. The fastener arrangement (1) according to claim 3, characterized in that the reinforcement part (11) has a flat body (11a) with openings lying upon the back side of the holder (9), wherein the side wall elements (19) open out on opposite edges of the flat body (11a), the edge regions of which side wall elements (19) form contact surfaces for placement on the object mount (3).

5. The fastener arrangement (1) according to claim 3, characterized in that the holder (9) has two edge segments (9b) opposite one another projecting from the base body (9a), wherein the side wall elements (19) of the reinforcement part (11) are mounted in gaps between the edge segments (9b), wherein the edge regions of the side wall elements (19) forming the contact surfaces project outward beyond the edge segments (9b) of the holder (9).

6. The fastener arrangement (1) according to claim 1, characterized in that the object mount (3) is in the shape of a hollow cylinder open at one end, wherein the fastener (2) can be inserted into the object mount (3) through the open end.

7. The fastener arrangement (1) according to claim 6, characterized in that the contact surfaces of the reinforcement part (11) abut the inner side of the side wall of the hollow-cylindrical object mount (3).

8. The fastener arrangement (1) according to claim 5, characterized in that the retaining ring (10) is mounted secure against rotation on the edge segments (9b) of the holder (9), wherein protrusions (17) open out, especially at the inner sides of the edge segments (9b), said protrusions engaging in the cavities (15) of the retaining ring (10).

9. The fastener arrangement (1) according to claim 1, characterized in that the press-on element (8), in a locked position, is positionally fixed on the retaining ring (10) and adjoins the adhesive reservoir (20).

10. The fastener arrangement (1) according to claim 9, characterized in that recesses (14) are provided on the inner wall of the retaining ring (10), wherein in the locked position of the press-on element (8), latching lips (13) projecting outward on its outer lateral surface engage in the recesses (14) of the retaining ring, and that in the locked position, the press-on element (8) projects over the edge of the retaining ring (10) facing away from the holder (9).

11. The fastener arrangement (1) according to claim 3, characterized in that an adhesive strip (21) is provided on the edge of the outer side of the holder (9), wherein a pre-fixing of the fastener (2) to the substrate can be carried out by means of the adhesive strip (21).

12. The fastener arrangement (1) according to claim 9, characterized in that the press-on element (8) has a filling opening (23) through which adhesive agent can be supplied to the adhesive reservoir (20) when the press-on element (8) is in the locked position.

13. The fastener arrangement (1) according to claim 12, characterized in that adhesive agent stored in a tube (24) can be supplied to the adhesive reservoir (20) through the filling opening (23).

14. The fastener arrangement (1) according to claim 13, characterized in that the filling opening (23) has a thread onto which a threaded head (25) of the tube (24) can be screwed, wherein adhesive agent can be supplied to the adhesive reservoir (20) when the tube (24) is screwed onto the filling opening (23).

15. The fastener arrangement (1) according to claim 13, characterized in that a piercing point (26) is provided on the exposed top of the press-on element (8), onto which a membrane of the tube (24) sealing a tube opening can be pushed.

16. The fastener arrangement (1) according to claim 12, characterized in that after adhesive agent has been supplied to the adhesive reservoir (20) through the filling opening (23), the press-on element (8) can be rotated out of the locked position into an actuation position, wherein the press-on element (8) can be pressed against the holder (9) in the actuation position, such that the adhesive is guided out of the adhesive reservoir (20) through the openings in the holder (9) and forms an adhesive layer that fixes the fastener (2) to the substrate.

17. The fastener arrangement (1) according to claim 16, characterized in that the press-on element (8) can be pressed in the direction of the base body (9*a*) of the holder (9) until the face of the press-on element (8) facing away from the holder (9) closes flush with the edge of the retaining ring (10).

18. The fastener arrangement (1) according to claim 16, characterized in that crosspieces (16) delimiting openings of the holder (9) and crosspieces (18) delimiting openings of the reinforcement part (11) lie within the adhesive layer and form a reinforcement therefor.

* * * * *